Oct. 2, 1951  R. EDWARDS ET AL  2,569,464
AGRICULTURAL CRUST BUSTING IMPLEMENT
Filed Oct. 2, 1947  3 Sheets-Sheet 3
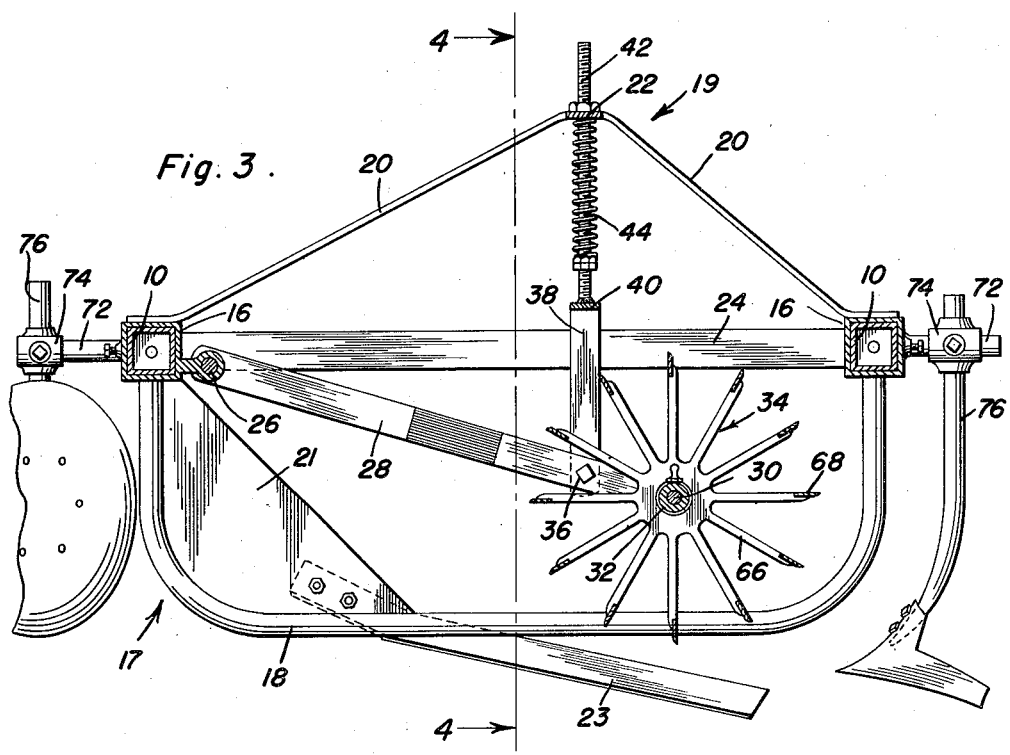
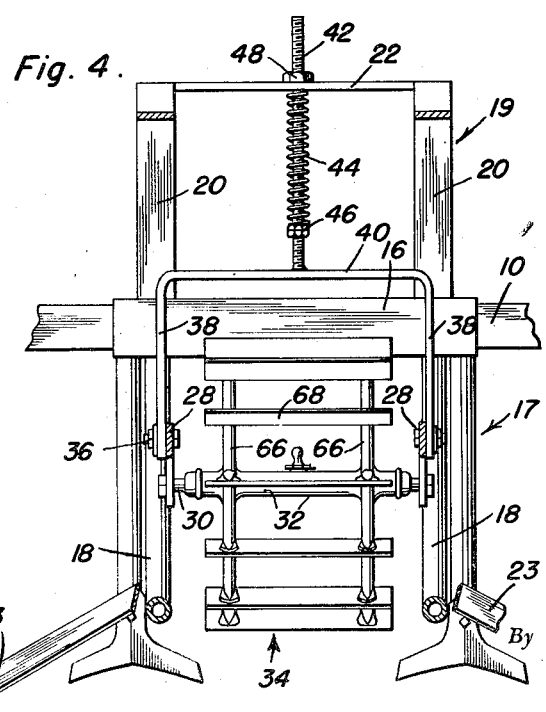
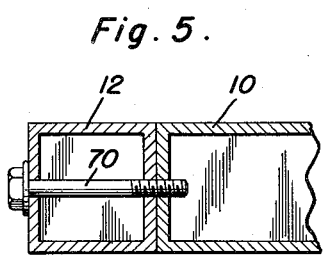
Inventors
Ross Edwards
Jack Brogden
By *Clarence A. O'Brien
and Harvey B. Jacobson*
Attorneys Patented Oct. 2, 1951

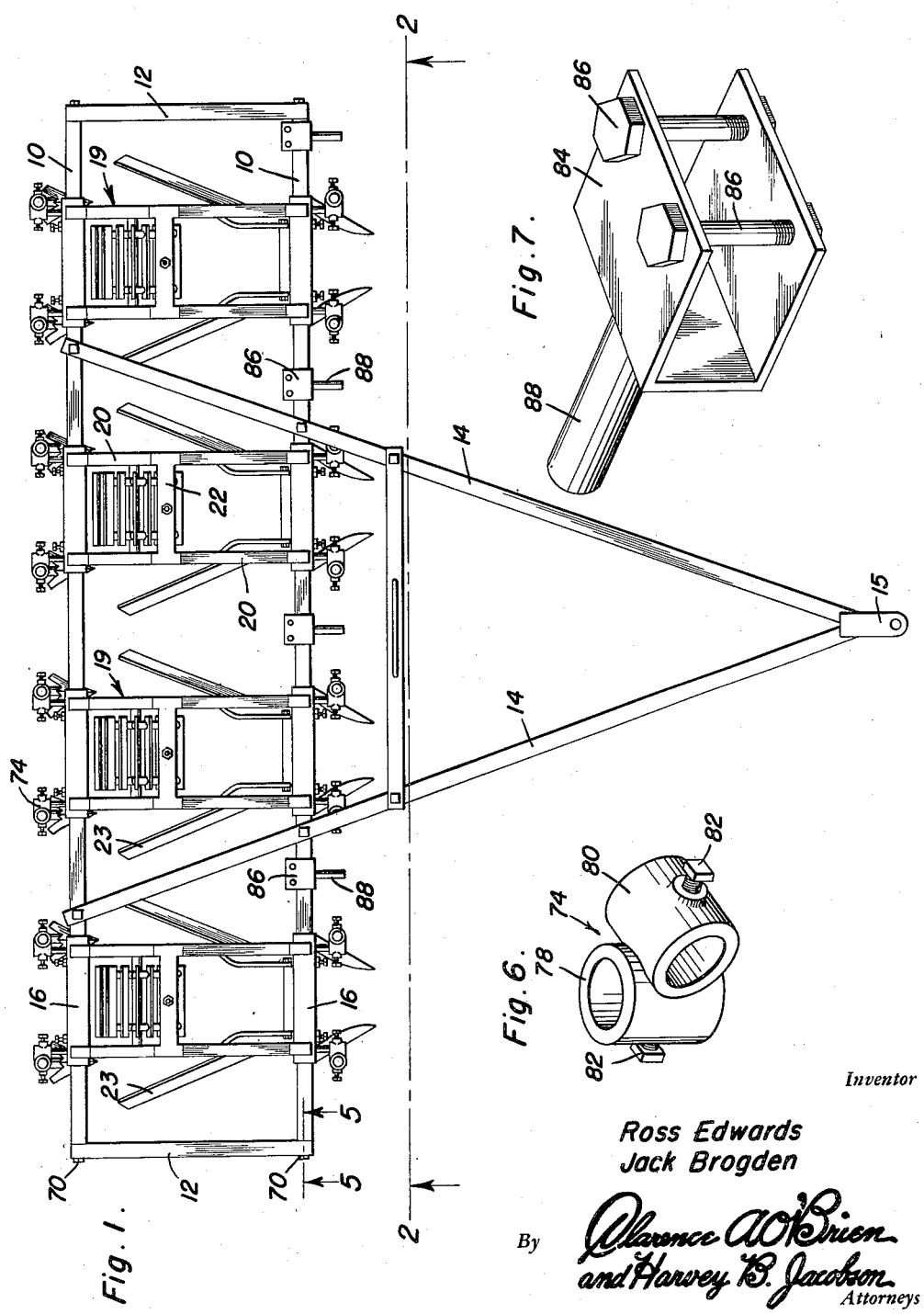

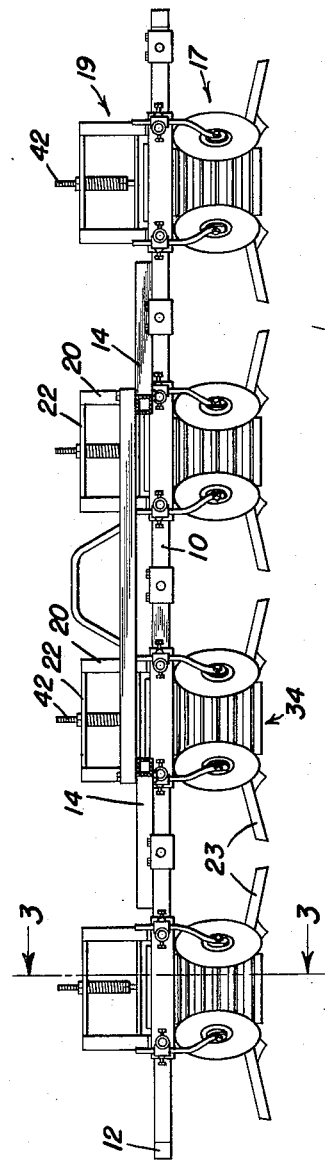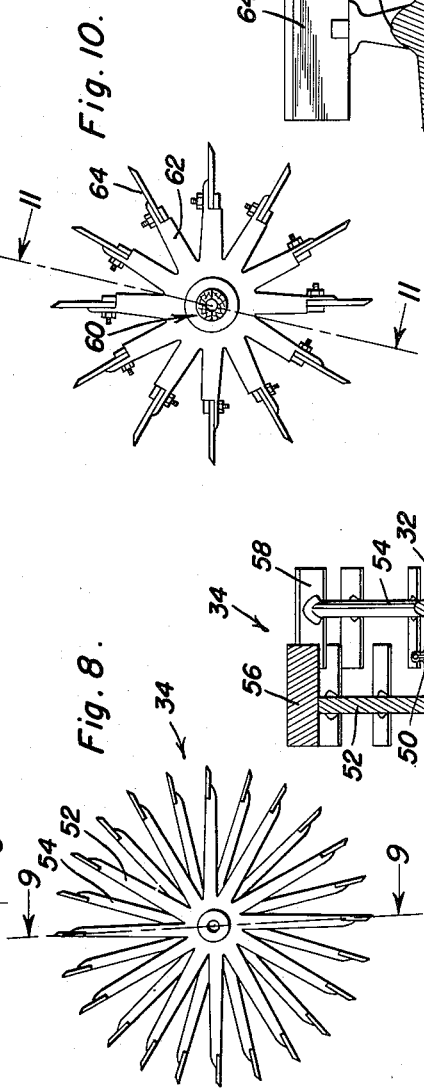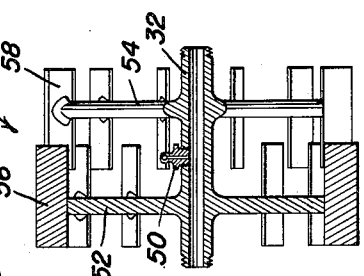

2,569,464

UNITED STATES PATENT OFFICE 2,569,464

AGRICULTURAL CRUST BUSTING IMPLEMENT

Ross Edwards and Jack Brogden, Lubbock, Tex.

Application October 2, 1947, Serial No. 777,432

4 Claims. (Cl. 97—52)

This invention pertains to novel and useful improvements in an agricultural crust busting implement and more specifically has reference to a farm implement and attachment for advantageously breaking a hardened crust of ground without injuring tender young plants growing therein. The invention is characterized by the provision of a novel construction of wheel for breaking the soil in an improved manner without disturbing or injuring growing plants closely adjacent the area of soil being treated.

A further feature of the invention resides in providing a wheel having a plurality of blades for breaking the surface of the ground without agitating the same, at a plurality of closely adjacent positions and with a minimum disturbance of the surface of the ground being treated.

An additional feature of the invention resides in an improved and novel means for regulating positively the depth of penetration of the soil by the wheeled breaking attachment.

A still further feature consists in providing improved and novel means for quickly and accurately regulating the depth of penetration of the soil by the ground breaking wheel.

And final important features of the invention to be specifically enumerated herein reside in the provision of an attachment characterized by the features set forth above and wherein is provided a novel manner of supporting a plurality of the attachments in adjustably spaced position and in conjunction with additional provision for positioning a variety of other ground working attachments on the same supporting means.

These, together with various ancillary objects of the invention which will later become apparent as the following description proceeds, are attained by this device, the preferred embodiment of which has been illustrated, by way of example only, in the accompanying drawings, wherein:

Figure 1 is a top plan view showing a suitable embodiment of the invention;

Figure 2 is a front elevational view of the device of Figure 1, taken substantially upon the plane of the vertical section line 2—2 of Figure 1;

Figure 3 is a transverse vertical sectional view through one of the crust busting attachments and is taken substantially upon the plane of the section line 3—3 of Figure 2;

Figure 4 is a further detail view taken in vertical section substantially upon the plane of the section line 4—4 of Figure 3;

Figure 5 is a detail view on an enlarged scale taken substantially upon the vertical plane of the section line 5—5 of Figure 1;

Figure 6 is a perspective view of one suitable form of clamping means which may be employed for supporting parts of the device from the supporting frame;

Figure 7 is a perspective view of a second and modified form of clamping means constituting supports for parts of the invention;

Figure 8 is a side elevational view of one form of a rotary ground breaking wheel and is taken in end elevation with reference to the construction of Figure 9;

Figure 9 is a vertical sectional view, taken substantially upon the plane of the section line 9—9 of Figure 8 and showing the preferred form of rotary ground breaking implement;

Figure 10 is a side elevational view similar to Figure 8 of a second form of rotary ground breaking means which may be alternatively employed in the device of the preceding figure; and Figure 11 is a sectional detail view taken substantially upon the plane of the section line 11—11 of Figure 10.

Referring now more specifically to the accompanying drawings, wherein like numerals designate similar parts throughout the various views, attention is directed chiefly for the moment to Figures 1 and 2 wherein there is disclosed an implement support consisting of a generally rectangular frame having cross members 10 joined by end members 12 and provided with angularly disposed, forwardly extending drawbars 14 having a coupling member 15 for attaching the supports to any suitable draft means. Laterally spaced upon the transverse frame members 10 of the support and slidably adjustable thereon are a plurality of units 17, each of which carries one of the improved rotary implements for breaking the surface of the ground. Each of these units, as shown in Figures 1 and 3, includes forward and rearward housing members 16 which are slidably received upon the frame members 10, and which are connected by U-shaped, downwardly extending, preferably tubular members 18 which are intended to slide upon the surface of the ground and support the frame members 10 and 12 during operation of the device. The forward portions of members 18 have triangular reinforcing webs 21 from which extend rearward blades 23 which constitute knives for slicing the crust.

A generally H-shaped reinforcing frame and superstructure member, indicated generally at 19, and comprising side legs 20 and a cross member 22, is secured upon the top of and extends between the housing members 16. As shown best in Figure 3, the side members 20 are bent upwardly intermediate their ends, which extremities are rigidly attached, as by welding or otherwise, to the top of the slidable housing members 16.

Suitable transversely extending reinforcing members 24 extend between the housing members 16 to lend rigidity to the construction. Pivotally mounted as on a pivot pin or hinge 26 secured to the forward housing 16 of each unit is a rearwardly extending lever consisting of parallel spaced side arms 28 which at their rear extremities journal therebetween on an axle 30, the hub 32 of a rotary, wheeled ground-breaking implement indicated generally at 34.

As shown best in Figures 3 and 4, the arms 28 of the lever member are pivoted, as at 36, to the lower extremities of the bifurcated arms 38 of a yoke 40 having an upwardly and vertically extending screw-threaded shank 42 extending through an aperture intermediate the ends of the above mentioned cross member 22 of the H-shaped frame. A suitable spring means 44 is interposed between the yoke member 40 and the under surface of the cross member 22, to yieldingly urge the yoke, the lever and the wheel unit 34 downwardly with respect to the supporting frame of the unit, the tensioning of the spring being adjusted by the lock nuts 46 on the threaded member 42, while a similar fastening nut 48 serves to regulate the maximum downward movement of the yoke and hence of the wheel unit 34.

The arrangement is such that when the device is drawn over the ground in any suitable manner, the support framework slides upon the runner members 18 which in turn limit the penetration of the soil by the wheel unit 34 to a constant value as determined by the adjusting yoke, despite irregularities and inequalities in the surface of the ground being cultivated.

Obviously, by proper adjustment of the nuts 48 and 46, the lever member 28 and the wheel unit 34 may be raised and lowered with respect to the limiting means 16, to thereby cause penetration of the ground to any desired depth.

Attention is now directed more particularly to the construction of the wheeled unit 34, a preferred form of which has been illustrated in Figures 8 and 9.

This unit includes the tubular or hollow hub portion 32 above mentioned and which is provided at one or more points with suitable lubricating fittings 50 for an obvious purpose. Extending radially from the hub 32 are a plurality of laterally spaced sets of radial arms 52 and 54, two being shown for the sake of clarity in the drawings, although it will be readily understood that any suitable number of sets of arms may be provided. Detachably, or if desired, integrally secured to the outer extremities of the radial arms 52 and 54 are a plurality of preferably knife-blade elements 56 and 58, respectively, which are disposed parallel to and equidistantly spaced from and about the hub 32. As shown in Figure 9, the arms 52 and 54 engage the blades 56 and 58 off center from their medial point, whereby the blades are permitted to be interdigitated with each other, adjacent sets of arms and blades being staggered radially with respect to each other as clearly shown in these figures.

By providing a plurality of blades in a plurality of sets, a great number of penetrations of the ground is effected, each of these penetrations being of relatively small extent and local in character, whereby the surface of the ground is thoroughly broken but is not displaced with the danger of resulting injury to small growing plants adjacent the device.

Alternatively, a form of wheeled unit indicated in Figures 10 and 11 may be employed, such a unit consisting of a hub 60 having a single set of radial arms 62 to which are secured a plurality of transversely disposed knife-edge blades 64 connected to the arms intermediate and medially of the length of the blades. The construction and operation of this modified form of wheel is otherwise identical with that of Figures 8 and 9, although this form of wheel while of simpler construction being not as efficient in breaking the ground at a plurality of places with a minimum disturbance of the ground surface.

Finally, in some instances, a form of wheel illustrated in Figure 4 may be employed, this form being similar to that of Figures 8 and 9 except that the two sets of radial arms 66 are disposed in pairs in the same radial plane, and each of the knife blades 68 is attached to a pair of such arms. Otherwise, this form of wheel is identical with those previously described.

As will be readily appreciated, any suitable number of units may be positioned upon a support frame, and for this purpose, the end members 12 are attached to the cross members 10 in the manner shown in Figure 5.

As shown in this view, the members 10 and 12 are preferably of hollow square cross section, and are united by a laterally extending bolt or other fastening means 70. It is therefore merely necessary to remove the bolt 70 and one of the end sections 12 to order to obtain access to the transverse members 10 for removing or adding the guide housings 16 of the individual cultivator units thereto.

If desired, extending forwardly and rearwardly from suitable points upon the housing members 16 are provided a plurality of integral rods 72 upon which are adjustably secured clamps 74 for supporting the shank 76 of any suitable type of cultivating implement which may be conveniently employed with this device. As shown in Figure 6, the clamp 72 consists of a pair of perpendicularly disposed, rigidly attached tubular members 78 and 80, each provided with a set screw 82 for securing the clamp upon the supporting rods 72 and for securing in adjusted position the implement shaft 76.

In addition to these clamp means, there is illustrated in Figure 7 a further construction of clamp which, in some instances, may be found useful with the device. This clamp consists of a generally U-shaped frame member 84 whose open end is adapted to embrace one of the transverse support bars 10 or to clamp upon, join and secure ends of adjacent sections of the bars 10, and which is intended to be clamped thereon as by fastening bolts 86. From the bight of the U-shaped clamp 84 there laterally extends a rod 88 upon which may be mounted, as by means of one of the clamps shown in Figure 6, any desired implements which could be used in conjunction with the ground-breaking attachments of this invention.

From the foregoing, it will be seen that there has been provided a simple construction of device which is highly efficient for breaking a hardened crust of ground about growing young plants, with a minimum disturbance of the surface of the ground and with the elimination of much of the hazard to growing plants. In addition, the support means or runner 18 of each of the units constitute a guard means preventing uneven penetration of the wheeled unit into the surface of the ground, while the latter may be readily adjusted by proper manipulation of the yoke and lever members to attain the desired and most effective depth of penetration of the soil.

It should be here noted that in all row planting areas of the plains country, especially in Western States, planting is done in deep furrows. The usual heavy spring rains fill these furrows, forming a heavy crust, which it is difficult for seeds of certain grains and cotton to penetrate. The primary function and advantage of this device is to break this crust to assist penetration by growing plants. The deep furrows adequately guide the runners, keeping the wheel over the middle of the drill.

It should be apparent that the wheel construction of Figures 8 and 9 provides twice as many penetrations of the soil without decreasing materially the space between adjacent blades, thereby minimizing danger of moist soil balling or clogging the wheel.

From the foregoing, it is believed that the manner of operating, constructing and employing the device will be readily understood and further explanation is deemed to be unnecessary. Since numerous changes will readily occur to those skilled in the art after a consideration of the foregoing specification and accompanying drawings, it is not intended to limit the invention to the exact construction shown and described, since this is to be regarded as illustrative of the principles of the invention only. Accordingly, all suitable modifications and equivalents may be resorted to falling within the scope of the appended claims.

Having described the invention, what is claimed as new is:

1. An agricultural implement comprising a frame having a pair of spaced cross members and a plurality of wheeled units detachably and adjustably mounted on said cross members, each of said wheeled units including forward and rear housing members slidably received on said cross members, a pair of tubular U-shaped skids terminally fixed to said housing members, webs fixed to and reinforcing said U-shaped skids, blades mounted on said webs, a pair of levers pivoted on said forward housing member, a shaft joining the free ends of said levers, a tool mounted on said shaft for rotation, and a spring mounting for said levers and including a spring operatively connected to the free ends of said levers and urging the free ends of said levers and said tool downwardly.

2. An agricultural implement comprising a frame having a pair of spaced cross members and a plurality of wheeled units detachably and adjustably mounted on said cross members, each of said wheeled units including forward and rear housing members slidably received on said cross members, a pair of tubular U-shaped skids terminally fixed to said housing members, webs fixed to and reinforcing said U-shaped skids, blades mounted on said webs, a pair of levers pivoted on said forward housing member, a shaft joining the free ends of said levers, a tool mounted on said shaft for rotation, and a spring mounting for said levers, said spring mounting including a pair of inverted substantially V-shaped side members terminally secured to said housing members, a cross-strap joining the side members, a threaded shank slidably carried by said cross strap, a yoke fixed to said shank and pivoted to said levers adjacent said shaft, a stop nut threaded on said shank and bearing against said cross strap for vertical adjustment of said shank and said yoke, and spring means restricting upward movement of said shank and said yoke.

3. An agricultural implement comprising a frame having a pair of spaced cross members and a plurality of wheeled units detachably and adjustably mounted on said cross members, each of said wheeled units including forward and rear housing members slidably received on said cross members, a pair of tubular U-shaped skids terminally fixed to said housing members, webs fixed to and reinforcing said U-shaped skids, blades mounted on said webs, a pair of levers pivoted on said forward housing member, a shaft joining the free ends of said levers, a tool mounted on said shaft for rotation, spring means operatively connected to the free ends of said levers and restricting upward swinging movement of said levers, a plurality of rods fixed to and projecting longitudinally from said housing members, clamps adjustably secured on said rods, and cultivating tools having shanks adjustably carried by said clamps.

4. An agricultural implement comprising a substantially rectangular frame having a pair of transverse beams, a plurality of wheeled units carried by said frame, each of said wheeled units including forward and rear housing members slidably received on and embracing said beams, means carried by said housing members for holding the same adjusted longitudinally on said beams, an H-shaped frame terminally fixed to said housing members, U-shaped slides extending between said beams and having their ends fixed to said housing members, said slides including forward legs, webs fixed to the forward legs and web portions of said slides, rearwardly extending crust slicing blades detachably secured to said webs, a pair of levers pivotally mounted on said forward housing member for vertical swinging movement, a shaft carried by the free ends of said levers, a wheel disposed between said slides and mounted on said shaft, and means adjustably securing said levers to said H-shaped frame for adjustably raising and lowering said levers and said wheel.

ROSS EDWARDS.
JACK BROGDEN.

REFERENCES CITED

The following references are of record in the file of this patent:

UNITED STATES PATENTS

| Number | Name | Date |
|---|---|---|
| 510,266 | Keiger | Dec. 5, 1893 |
| 532,689 | McColm | Jan. 15, 1895 |
| 763,324 | Roberts | June 21, 1904 |
| 1,087,389 | McLeod | Feb. 17, 1914 |
| 1,310,924 | Ono | July 22, 1919 |
| 1,653,760 | Carey | Dec. 27, 1927 |
| 1,673,184 | Cady | June 12, 1928 |
| 2,243,241 | Burns | May 27, 1941 |